(12) United States Patent
Pannek (10) Patent No.: US 8,966,978 B2
(45) Date of Patent: Mar. 3, 2015

(54) SENSOR ARRANGEMENT FOR DETERMINING AN ANGLE OF ROTATION

(75) Inventor: Thorsten Pannek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 13/400,775

(22) Filed: Feb. 21, 2012

(65) Prior Publication Data

US 2012/0210791 A1    Aug. 23, 2012

(30) Foreign Application Priority Data

Feb. 18, 2011 (DE) .................. 10 2011 004 366

(51) Int. Cl.
| | | |
|---|---|---|
| G01P 15/08 | (2006.01) | |
| B62D 15/02 | (2006.01) | |
| B62D 6/10 | (2006.01) | |
| G01L 5/22 | (2006.01) | |
| G01L 3/10 | (2006.01) | |
| G01D 5/12 | (2006.01) | |

(52) U.S. Cl.
CPC .............. *B62D 15/0215* (2013.01); *B62D 6/10* (2013.01); *G01L 5/221* (2013.01); *G01L 3/10* (2013.01); *G01D 5/12* (2013.01)
USPC ........................................ 73/514.02

(58) Field of Classification Search
CPC ............ G01D 5/3473; G01D 5/34792; G01D 5/34707; G01D 5/34715; G01D 5/34776; B60W 10/06; B60R 22/40
USPC ...................................... 250/231.18
See application file for complete search history.

(56) References Cited

U.S. PATENT DOCUMENTS 5,650,613 A * 7/1997 Lewis ....................... 250/231.18

FOREIGN PATENT DOCUMENTS

| DE | 19958504 | 6/2001 |
| DE | 102007028483 | 12/2008 |

* cited by examiner

*Primary Examiner* — Hezron E Williams
*Assistant Examiner* — Mark A Shabman
(74) *Attorney, Agent, or Firm* — Michael Best & Friedrich LLP (57) ABSTRACT

A sensor arrangement for determining an angle of rotation of at least one shaft when rotated around its axis of rotation, which arrangement has at least one acceleration sensor which is arranged on the at least one shaft. The invention also relates to a method for determining an angle of rotation of at least one shaft when rotated around its axis of rotation, the angle of rotation being determined by at least one acceleration sensor which is arranged on the at least one shaft.

9 Claims, 8 Drawing Sheets

Prior Art

SENSOR ARRANGEMENT FOR DETERMINING AN ANGLE OF ROTATION

BACKGROUND OF THE INVENTION

The invention relates to a sensor arrangement and to a method for determining an angle of rotation.

Modern electrical power-assisted steering systems for motor vehicles control the steering force assistance on the basis of a torque impressed by the driver. This torque is converted into a differential angle signal by a torsion bar of defined rigidity between an input shaft and an output shaft. In this case, a measurement range for the torque of +/−8 Nm corresponds to a differential angle of +/−4°, for example. This differential angle is measured by a so-called torque sensor which is arranged in the region of the input and output shafts. For further processing, the torque sensor provides a signal proportional to the differential angle and the torque.

The document DE 199 58 504 A1 proposes a sensor arrangement for detecting the angle of rotation and/or the torque of rotating mechanical parts. In this case, a torsion shaft is arranged, as an outer shaft, on a rotating part, a torque acting on a first end of the part and the torque being taken off at a second end. An inner shaft is arranged concentrically with respect to the outer shaft and its first end is fastened to the outer shaft in the region in which the torque is input. Magnets are arranged at the end of the outer shaft and inner shaft, said magnets having magnetic fields which are radially oriented with respect to the axes of the shafts and each being assigned a stationary sensor.

Under the action of the torque, the rotation of the magnetic fields relative to one another can be measured, the angle of rotation being proportional to the torque.

A sensor arrangement and a method for producing a sensor arrangement are known from the document DE 10 2007 028 483 A1. In this case, the sensor arrangement has at least one magnetic flux collection element which can be used to supply the magnetic flux of a magnetic circuit to a sensor element. The magnetic flux collection element consists of at least two parts which at least partially overlap in an overlapping region, the two parts being at least partially surrounded by an encapsulation and being held in a particular position with respect to one another.

SUMMARY OF THE INVENTION

The angle of rotation of a shaft and the differential angle and/or torque between two shafts, for example an input shaft and an output shaft, are detected via the movement of at least one of the shafts in the gravitational field of the earth, usually in the gravitational field of a body of sufficient mass, for example a heavenly body. It is thus possible to use, for example, two micromechanical biaxial acceleration sensors, and thus components which are considerably smaller and more cost-effective than known magnetic sensors, in the sensor arrangement.

A method for determining a torque, a steering angle, a steering speed and a steering direction can generally be carried out in an electrical power-assisted steering system of a motor vehicle using the provided sensor arrangement by determining the angle of rotation and/or differential angle.

In one possible embodiment of the invention, provision may be alternatively or additionally made for an inertia to be measured in order to determine the angle of rotation of a shaft using at least one acceleration sensor.

In one refinement of the invention, at least one biaxial acceleration sensor is respectively mounted on the input and output shafts which can be connected to one another via a torsion bar. The measuring axes of the two channels of a respective acceleration sensor are arranged and/or oriented in a radial direction with respect to an axis of rotation of at least one shaft and are phase-shifted through 90°. The measuring axes are generally oriented in two spatial directions which are perpendicular to one another, for example in the x and z directions, the z direction being oriented in the direction of the gravitational field of the earth and thus being oriented in the direction of the prevailing gravity.

The individual acceleration sensors may be constructed in a similar manner to a peripheral acceleration sensor and may therefore comprise a surface-mounted device or an SMD component on a printed circuit board or insert parts in a small plastic housing. An acceleration sensor is fastened to a shaft, for example, by clipping it to holding elements which are suitable for this purpose and are fitted to the shaft. In one refinement of the invention, at least one acceleration sensor may be in the form of a micromechanical surface-mounted device which is used to capacitively measure the acceleration of a shaft.

Since the acceleration sensors are very light in contrast to magnetic components, complicated mounting processes such as welding, adhesive bonding or pressing-on are dispensed with. With regard to their position with respect to one another and in order to take into account an offset, the acceleration sensors are typically calibrated.

In one refinement of the invention, the angle of rotation of at least one shaft is differentially measured. At least one acceleration sensor is used during the determination of a difference in the angle of rotation, which needs to be carried out in this case, two acceleration sensors generally being used for each shaft. In a further refinement, for the purpose of differential measurement, a third acceleration sensor may be arranged as a reference acceleration sensor on a respective shaft and may be used to differentially determine the angle of rotation.

The voltage for an acceleration sensor on the at least one moving shaft may be supplied via sliding contacts, a coil spring, an inductive supply or an energy converter which converts a rotational or steering movement of a steering system and/or vibrations of a motor vehicle into energy.

A useful signal which is provided by an acceleration sensor on the moving shaft may likewise be tapped off via sliding contacts, a coil spring or wirelessly, for example via an inductive pick-off or via radio.

The sensor arrangement according to the invention is designed to carry out all of the steps of the presented method. In this case, individual steps of this method can also be carried out by individual components of the sensor arrangement. Furthermore, functions of the sensor arrangement or functions of individual components of the sensor arrangement may be implemented as steps of the method. In addition, it is possible for steps of the method to be implemented as functions of at least one component of the sensor arrangement or of the entire sensor arrangement.

BRIEF DESCRIPTION OF THE DRAWINGS

Further advantages and refinements of the invention emerge from the description and the accompanying drawings.

It goes without saying that the features mentioned above and the features still to be explained below can be used not only in the combination stated in each case but also in other combinations or alone without departing from the scope of the present invention.

DETAILED DESCRIPTION

The invention is diagrammatically illustrated in the drawings using embodiments and is described in detail below with reference to the drawings.

The figures are described in a coherent and comprehensive manner; the same reference symbols denote the same components.

Figure 1:
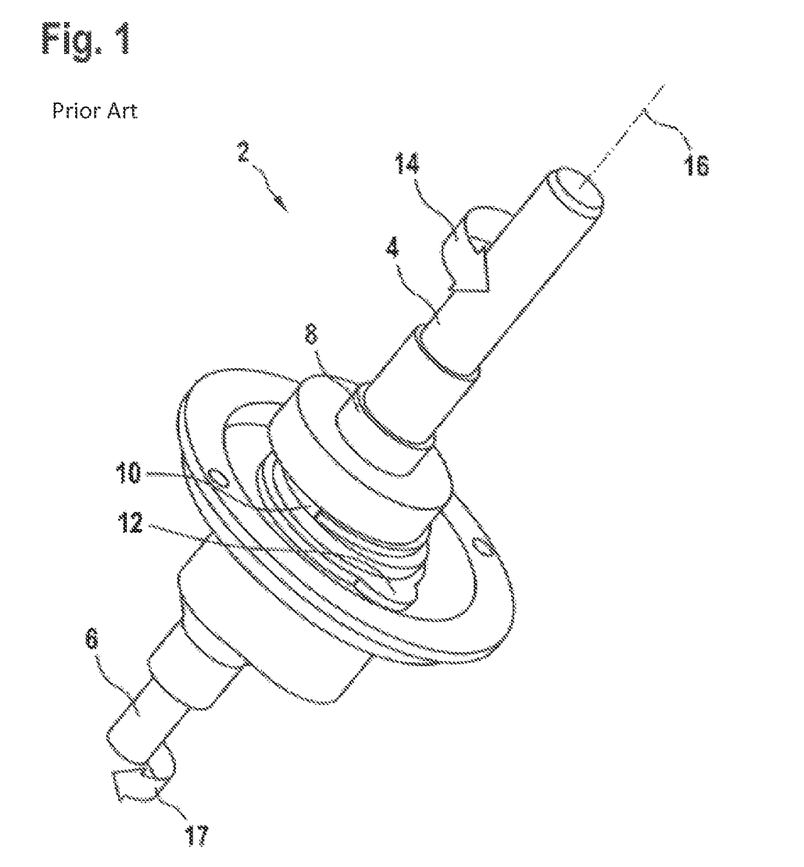
FIG. 1 shows a diagrammatic illustration of a first example of a torque sensor known from the prior art.

FIG. 1 shows a diagrammatic illustration of a first example of a torque sensor 2 which is known from the prior art. In this case, this torque sensor 2 is designed to detect a differential angle between an input shaft 4 and an output shaft 6. The torque sensor 2 comprises a magnet unit 8, a soft magnetic flux conductor 10 and a sensor unit 12. A rotational movement 14 of the input shaft is also indicated in FIG. 1. In addition, the input shaft 4 and the output shaft 6 are connected to one another via a torsion bar covered by the torque sensor 2. In the event of a relative rotation between the output shaft 4 and the input shaft 6 around a common axis of rotation 16, this torsion bar is twisted, thus producing a torque 17 which in turn depends on a differential angle between the input shaft 4 and the output shaft 6 and can be measured using the torque sensor 2 illustrated.

The differential angle is typically detected inductively or magnetically using potentiometers. In the case of a magnetic method, the magnetic flux of a magnet, which is in the form of a magnet unit 8 and is fastened, for example, to the input shaft 4, is modulated, via the soft magnetic flux conductors 10 (flux tube unit) on the output shaft 6, on the basis of a rotation of the input shaft 4 with respect to the output shaft 6.

The magnetic flux is proportional to the torque 17 and is detected and output by one or more Hall elements as the sensor unit 12. The resolution is typically 0.002° and the accuracy is +/−4% over the intended service life of the torque sensor 2.

Such torque sensors 2 are typically large and heavy, which may result in disadvantages with the installation space, possible results of an accident and complicated fastening methods. The complex mechanical structure with expensive magnetic materials results in high costs. The torque sensor 2 comprises two or three components which are finally mounted in a complicated manner by the manufacturer of the steering system. In addition, the torque sensor 2 may detect only the torque, that is to say further components are needed to measure the steering angle, which components either measure the steering angle in an absolute manner or can be used to calculate a steering angle signal, for example, via a so-called index function in conjunction with a rotor position signal from a servo motor.

Details of a second torque sensor which is known from the prior art are illustrated in FIG. 2. This torque sensor comprises an inner ring 18 and an outer ring 20. In this case, the inner ring 18 has a first collar of fingers 22 and the outer ring 20 has a second collar of fingers 24. In this case, the fingers 22 of the inner ring 18 are arranged between magnetic north poles 26 and south poles 28, a magnetic flux between the fingers 22, 24 being short-circuited. The two rings 18, 20 themselves do not have any magnetic potential.

Figure 2A:
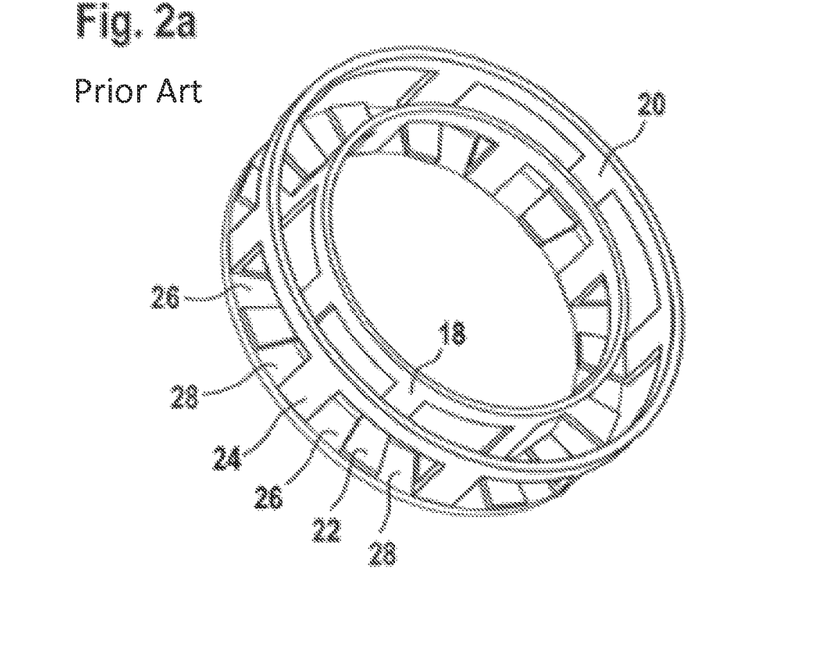
FIG. 2 shows a diagrammatic illustration of different views of a second example of a torque sensor known from the prior art.
Figure 2B:
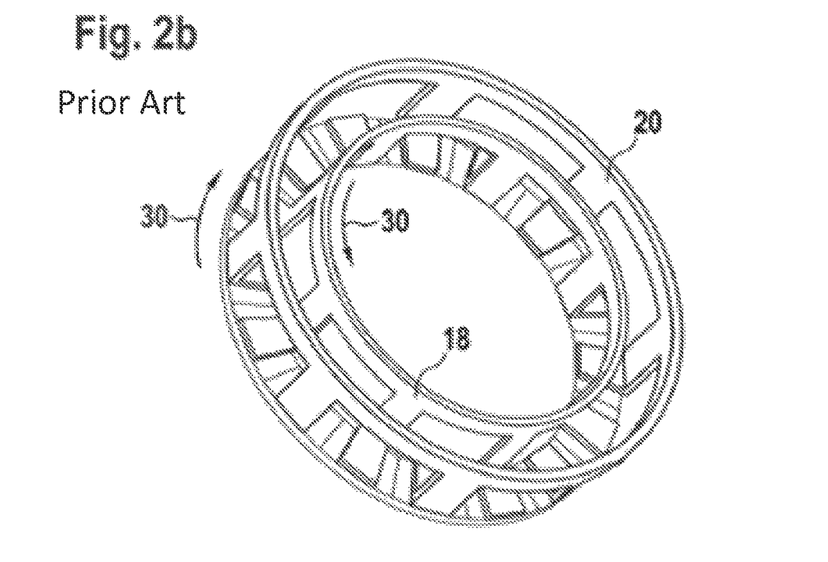

Overall, FIG. 2a shows the torque sensor in a position in which a neutral torque prevails. FIG. 2b shows an angle change between the magnets and the fingers 22, 24 when the rings 18, 20 rotate 30 relative to one another. On account of the rotation 30, the fingers 22, 24 cover a magnetic pole. A flux of the magnets is distributed by the fingers 22, 24 of the rings 18, 20. This results in the inner ring 18 and the outer ring 20 having different magnetic potentials.

Figure 2C:
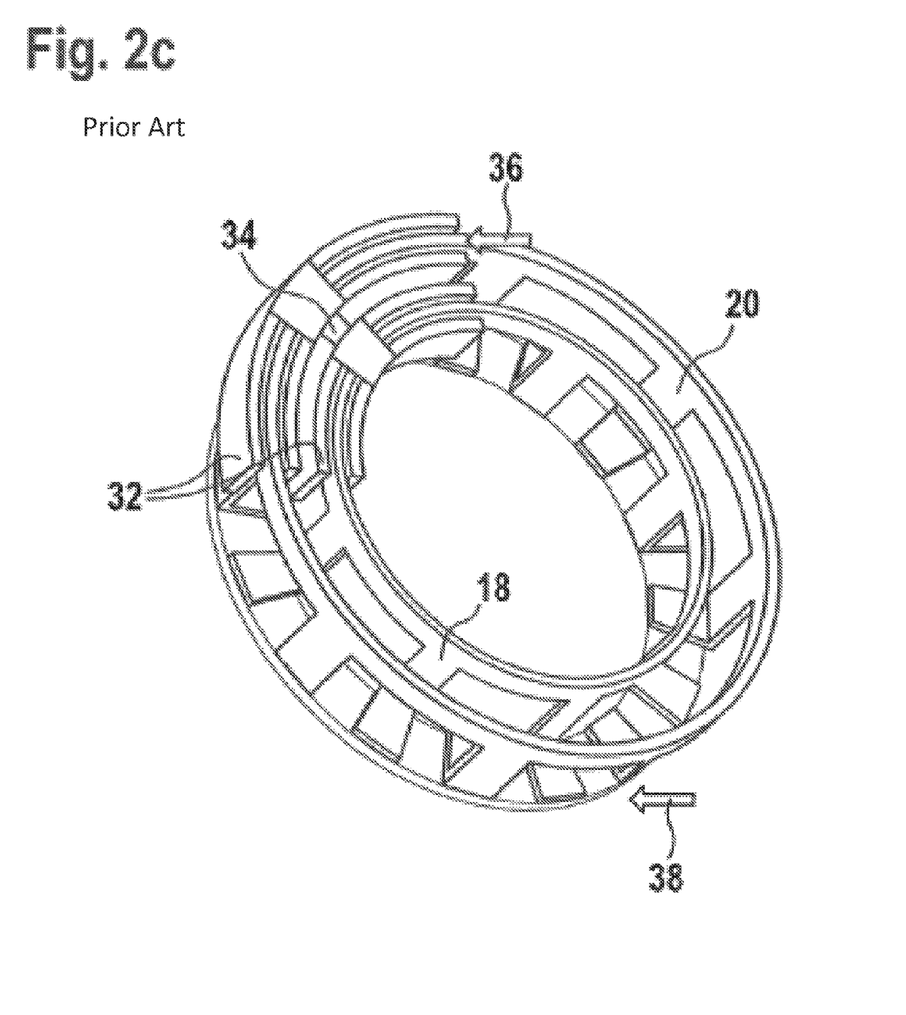

For a measurement of the magnetic flux between the rings 18, 20, reference is made to FIG. 2c. FIG. 2c additionally also illustrates magnetic flux collection elements 32 and a Hall sensor 34 in the form of a circuit. The arrow 36 indicates a first air gap between the outer ring 20 and the magnetic flux collection elements 32, through which gap it is possible to contactlessly measure the magnetic flux during rotation. A second air gap between the magnets and the fingers 24 of the outer ring 20 is indicated by the arrow 38. This second air gap allows the torque to be contactlessly measured. Provision is made for the magnetic flux to be concentrated on the Hall sensor 34 by the magnetic flux collection elements 32. The Hall sensor generates a signal which is proportional to the magnetic potential between the rings 18, 20 and is thus proportional to the position of the fingers 22, 24 with respect to the north and south poles 26, 28.

Figure 3A:
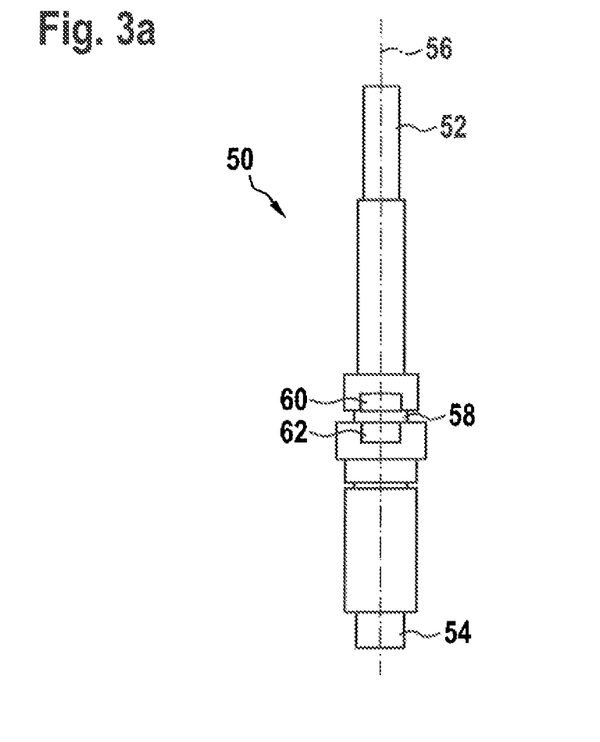
FIG. 3 shows a diagrammatic illustration of one embodiment of a sensor arrangement according to the invention in two views.
Figure 3B:
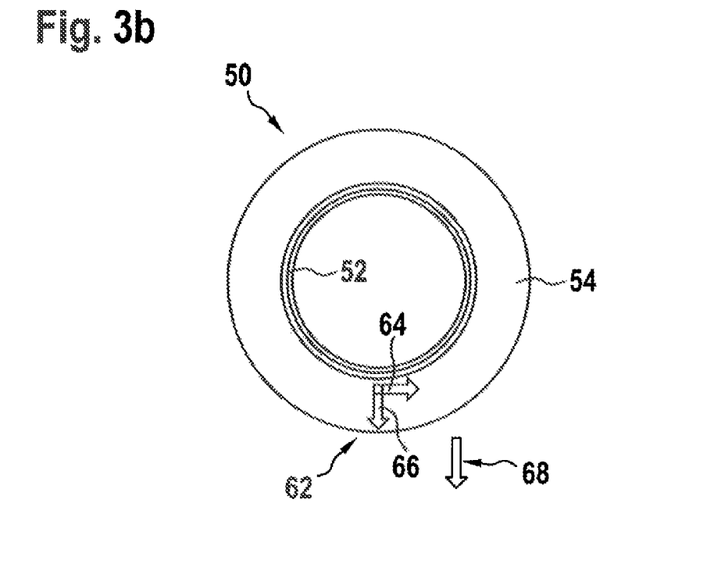

FIG. 3 shows a first embodiment of a sensor arrangement 50 according to the invention. In this case, the sensor arrangement 50 is illustrated in a plan view in FIG. 3a in a manner arranged on a first shaft 52 and on a second shaft 54 which can rotate around a common axis of rotation 56. FIG. 3b shows a sectional illustration of a detail of the sensor arrangement 50 in the axial direction. The two shafts 52, 54 are rotationally connected to one another via a torsion bar 58, one of these two shafts 52, 54 being able to be referred to as an output shaft and the other of these two shafts 52, 54 being able to be referred to as an input shaft.

The sensor arrangement 50 comprises a first acceleration sensor 60, which is arranged on the first shaft 52, and a second acceleration sensor 62 which is arranged on the second shaft 54. Both acceleration sensors 60, 62 are biaxial. In this case, a first measuring axis 64 of a respective acceleration sensor 60, 62 is oriented in the x direction. A second measuring axis 66 is oriented perpendicular to the first measuring axis 64, which is illustrated in FIG. 3b using the example of the acceleration sensor 62, but also applies to the acceleration sensor 60. Provision is also made for the two measuring axes 64, 66 to be oriented perpendicular to the axis of rotation 56 of the two shafts 52, 54, which axis of rotation is oriented in the y direction. In the embodiment illustrated, the second measuring axis 66 is therefore oriented in the z direction as the second spatial direction and in the direction of the gravitational field 68 of the earth.

This arrangement results in the at least one acceleration sensor 60, 62 being able to detect a rotation of the shafts 52, 54 around their axis of rotation 56 along the gravitational field 68 of the earth.

An angle of rotation of one of the shafts 52, 54 relative to the axis of rotation 56 can be respectively measured using in each case such an acceleration sensor 60, 62 which is arranged on one of the two shafts 52, 54. In this case, each measuring axis 64, 66, which allows an acceleration of the respective shaft 52, 54 in the direction in which the measuring axis 64, 66 is oriented to be measured, is connected to a channel. With respect to the measuring axes 64, 66 to which they are assigned, the channels are thus arranged in the radial direction with respect to the axis of rotation 56 and are phase-shifted through 90° according to an orientation of the measuring axes 64, 66.

Provision is also made for a channel, which is assigned to the first measuring axis 64, 66, to detect a sinusoidal or cosinusoidal signal in a first spatial direction and for a channel, which is assigned to the second measuring axis 64, 66, to detect a cosinusoidal or sinusoidal signal in a second spatial direction, the two spatial directions being radially oriented with respect to the axis of rotation 56 and the signals 74, 78 (FIG. 4) provided via the channels being phase-shifted through 90°.

Figure 4:
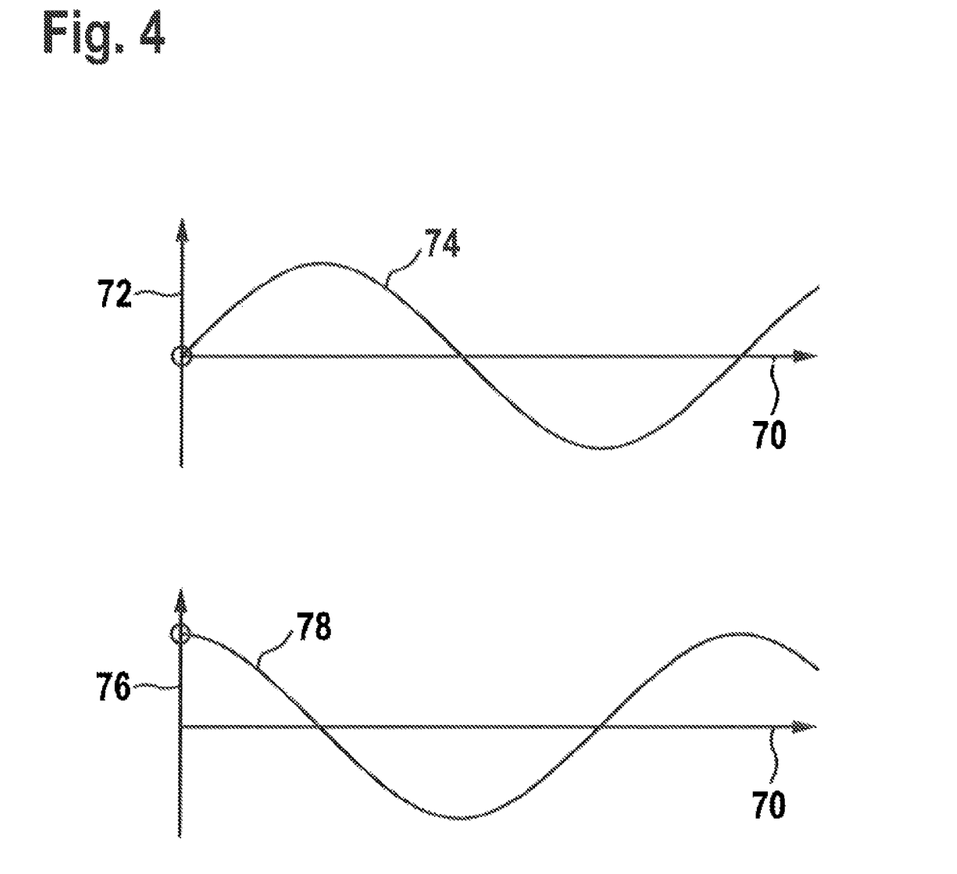
FIG. 4 shows examples of signals which are provided by the sensor arrangement from FIG. 3 in one embodiment of the method according to the invention.
Figure 5A:
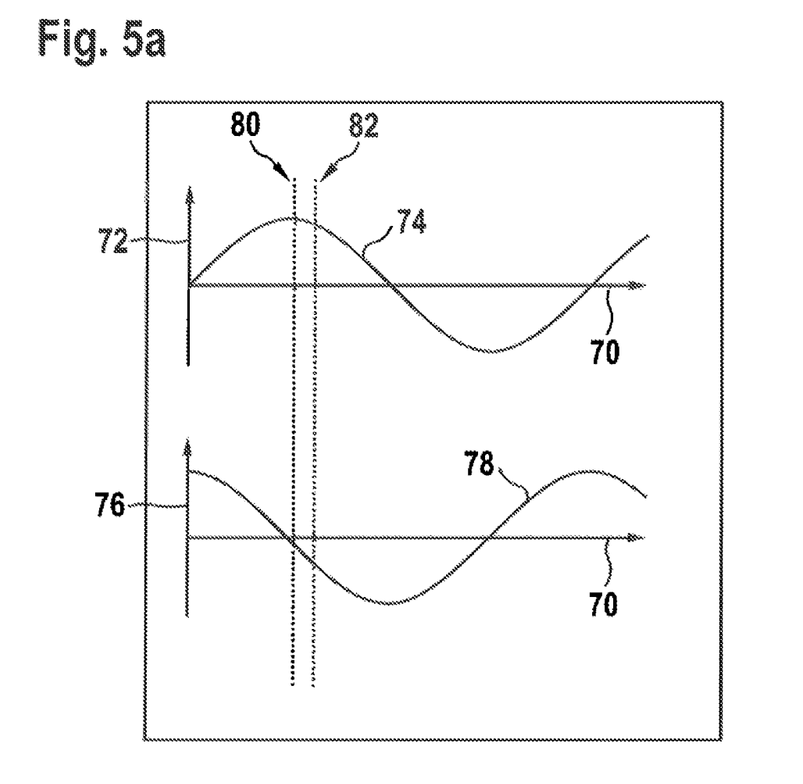
FIG. 5 shows a first example for evaluating the signals which are provided in the embodiment of the method according to the invention.
Figure 6:
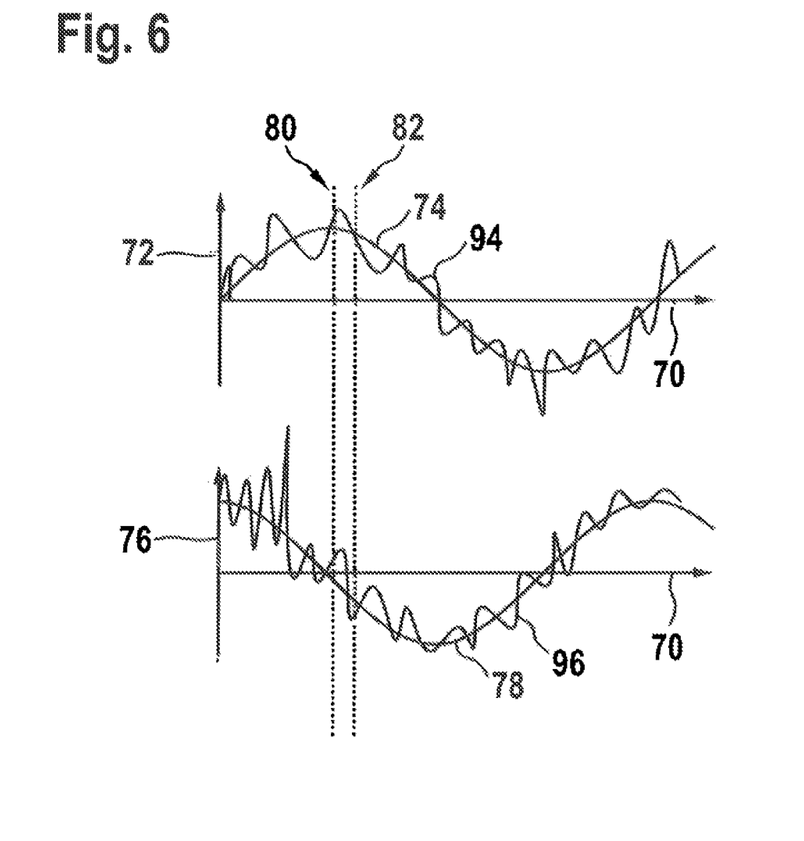
FIG. 6 shows a second example for evaluating the signals in the embodiment of the method according to the invention.

The graphs from FIGS. 4, 5a and 6 each comprise an abscissa 70 along which the time is plotted. An ordinate 72 of a first graph shows an amplitude for a profile of a sinusoidal signal 74 along the first measuring axis 64, that is to say in the first spatial direction, here the x direction, which signal is provided via the first channel. In addition to the abscissa 70 along which the time is plotted, the second graph comprises an ordinate 76 along which the amplitude of a profile of a cosinusoidal signal 78 provided via the second channel is plotted, which amplitude is oriented in the direction of the second measuring axis 66, that is to say the z direction as the second spatial direction.

When a shaft 52, 54 rotates around its axis of rotation 56 which is arranged perpendicular to the earth's gravitational field 68, both channels thus each detect a signal 74, 78 of one of said trigonometric functions, the two detected signals 74, 78 being phase-shifted through 90°.

The amplitudes of the signals 74, 78 are generally +/−1 g, where g represents the gravitational acceleration. Since a steering rod which comprises the two shafts 52, 54 is not arranged perpendicular to the gravitational field 68, the actual amplitude is smaller and depends on the inclination of the steering rod relative to the gravitational field 68 of the earth.

If both channels, for example those of the first acceleration sensor 60 on the first shaft 52, are scanned at a time $t_1$, the absolute angle of the measurement position of the first shaft 52 can be calculated, as the angle of rotation, by forming the arc tangent (arc tan) of the amplitude of the signals 74, 78 for both measuring axes 64, 66. If the second acceleration sensor 62 on the second shaft 54 is also scanned at the time $t_1$, two absolute angles, the difference between which corresponds to the differential angle of the two shafts 52, 54, can be determined as the angle of rotation. After at least one further measurement point has been scanned at the time $t_2$, the angular velocity and the direction of rotation of the shaft 52, 54 can also be calculated from the difference between two absolute angles on the side of at least one of the shafts 52, 54.

Further details of the evaluation of the signals 74, 78 provided via the two channels in the direction of the measuring axes 64, 66 emerge from FIG. 5a. In this case, a first dotted line 80 is used to indicate measured values $x_1$ (along the first measuring axis 64) and $z_1$ (along the second measuring axis 66) of the signals 74, 78 at a first time $t_1$. A second dotted line 82 is used to highlight measured values $x_2$ (along the first measuring axis 64) and $z_2$ (along the second measuring axis 68) of the signals 74, 78 at a second time $t_2$.

Figure 5B:
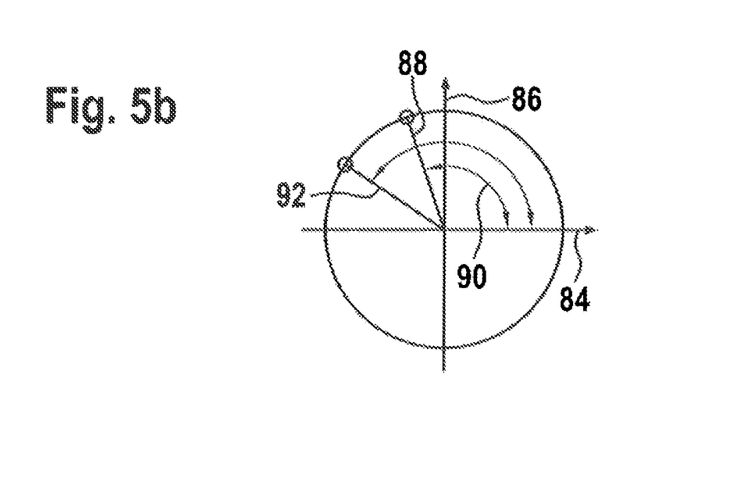

A vector diagram shown in FIG. 5b comprises, as the abscissa 84, an x axis along which a measured value is plotted in the direction of the first measuring axis 64 of at least one of the acceleration sensors 60, 62 and, as the ordinate 86, a z axis along which a measured value is plotted in the direction of the second measuring axis 66 of at least one of the acceleration sensors 60, 62.

Within the vector diagram from FIG. 5b, a first vector 88 illustrates the situation at the first time $t_1$, in which the signal 74 has the measured value $x_1$ in the x direction and the signal 78 has the measured value $z_1$ in the z direction. An absolute angle of rotation 90 $\phi_1$ at the first time $t_1$ is $\phi_1 = \arctan(x_1/z_1)$. A second vector 92 within the diagram 5b illustrates the situation at the second time $t_2$. At the second time $t_2$, the first signal 74 has the measured value $x_2$ in the x direction and the second signal has the measured value $z_2$ in the z direction. The following therefore applies to an angle of rotation $\phi_2$ at the time $t_2$: $\phi_2 = \arctan(x_2/z_2)$.

Furthermore, the following applies to an angular velocity $\omega: \omega = (\phi_2 - \phi_1)/(t_2 - t_1)$. However, it is also possible to calculate the angular velocity $\omega$ from the time derivative of the angle of rotation $\phi$. A direction of rotation is provided by the mathematical sign of the angle of rotation $\phi$ and thus of the time derivative of the angle $\phi$. A differential angle between the two shafts 52, 54 results from a difference between an angle of rotation $\phi_1$ determined by the first acceleration sensor and an angle of rotation $\phi_1$ determined by the second acceleration sensor 62 at a time t: $\Delta\phi = \phi_1$ (first acceleration sensor 60) $-\phi_1$ (second acceleration sensor 62).

In order to determine the angular velocity $\omega$, the first angle of rotation $\phi_1$ is therefore determined at a first time $t_1$ and the second angle of rotation $\phi_2$ is determined at the second time $t_2$ for at least one shaft 52, 54. The angular velocity $\omega$ of the at least one shaft 52, 54 is formed by forming the quotient of the difference in the second angle of rotation $\phi_2$ minus the first angle of rotation $\phi_1$ divided by the difference in the second time $t_2$ minus the first time $t_1$.

An amplitude of the signal 74, 78 along the first spatial direction is usually determined via the first channel and an amplitude of the signal 74, 78 along the second spatial direction is determined via the second channel. The angle of rotation $\phi$ is calculated while forming the arc tangent from the quotient of the amplitude of the measured value $x_1$, $x_2$ of the signal 74 along the first spatial direction divided by the amplitude $z_1$, $z_2$ of the signal 78 along the second spatial direction.

In order to implement the sensor arrangement 50, it is possible to use cost-effective low-g acceleration sensors 60, 62, which react to low gravitational accelerations and/or inertial forces, with a measurement range of +/−1 g over a rotation of 180° with a resolution of 14 bits, that is to say approximately 0.03 mg or approximately 3% of a thousandth of the gravitational acceleration g. However, the measurement range for the differential angle $\Delta\phi$ is only +/−4°. The resultant resolution is thus 8°/(14 bits/(180*/8*)) and is thus approximately 0.0028°. It is thus in a comparable range to the resolution of magnetic sensors. The accuracies of the acceleration sensors 60, 62 to be used are also comparable to those of the magnetic sensors.

In order to increase the accuracy further and also for reasons of redundancy, a respective further biaxial acceleration sensor 60, 62 may be arranged on the input and/or output shaft and therefore on at least one of the two shafts 52, 54. In this case, acceleration sensors 60, 62 should be arranged on the respective shaft 52, 54, for example at an angle of less than or equal to 45°.

Superimposed vibrations 94, 96 which are illustrated in FIG. 6 as superimpositions on the signals 74, 78 are generally an interference source for the measurements to be carried out. In order to separate these usually high-frequency vibrations 94, 96 from the signals 74, 78 which are at a comparatively low frequency in comparison, it is appropriate to subject the measured values $x_1, x_2, z_1, z_2$ provided by the channels of an acceleration sensor 60, 62 to low-pass filtering.

Figure 7:
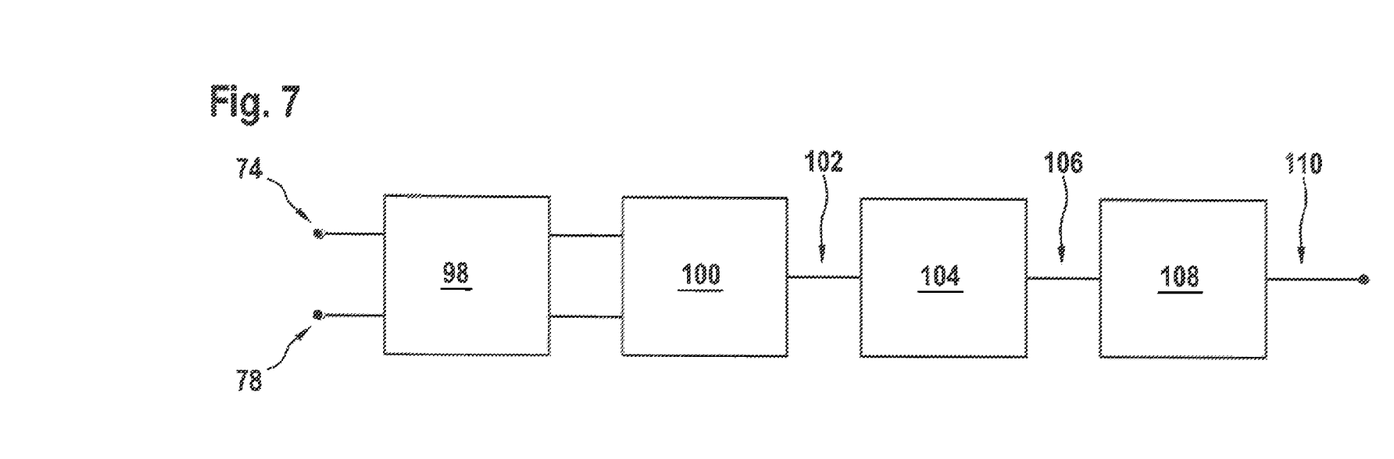
FIG. 7 shows a flowchart for carrying out the embodiment of the method according to the invention.

FIG. 7 shows a diagram for evaluating the signals 74, 78, for which an offset is first of all removed 98 in each case. In a further step, an arc tangent 100 is formed from the two signals 74, 78, for example using the CORDIC algorithm for calculating trigonometric functions. After the arc tangent 100 of the two signals 74, 78 has been formed, at least one angle of rotation $\phi_1$ 102 is provided at a time $t_1$. After a difference has been formed 104, an angle $\Delta\phi_i$ 106 between two times $t_i$ can be provided from two angles $\phi_i$. The angular velocity ω can be formed as a further result 110 from the differential angle $\Delta\phi_i$ taking into account a Nonius algorithm 108.

As the flowchart from FIG. 7 shows, a combined evaluation can be implemented within the scope of the method, the evaluation of the arc tangent 100 to be carried out being supplemented with a Nonius algorithm 108 in order to make the evaluation of the angle of rotation, the direction of rotation and the angular velocity more accurate.

Figure 8:
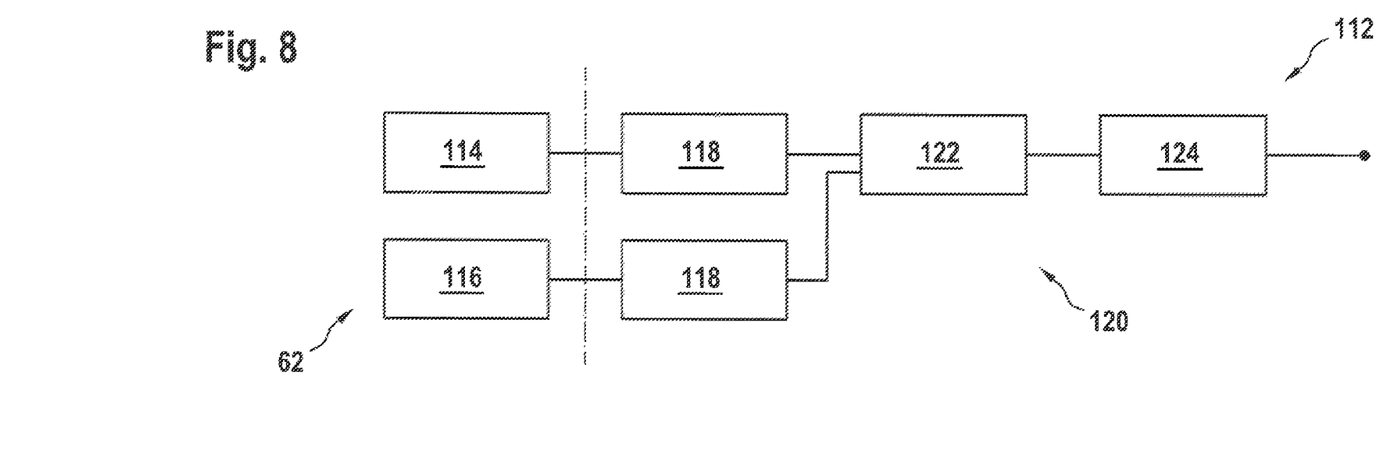
FIG. 8 shows a diagrammatic illustration of a detail of the embodiment of a sensor arrangement according to the invention.

In order to carry out the invention, FIG. 8 also shows a circuit arrangement 112 for evaluating signals provided by at least one acceleration sensor, for example the second acceleration sensor 62 in this case. Evaluation of signals 74, 78 from the first acceleration sensor 60 of the sensor arrangement 50 is set up in a corresponding manner.

In this case, the acceleration sensor 62 comprises a first channel 114 for the first signal 74 in the direction of the first measuring axis 64 and a second channel 116 for the second signal 78 in the direction of the second measuring axis 66. The two channels 114, 116 of the acceleration sensor 62 are each connected to a sampling module 118 of a circuit 120 in the form of an ASIC. This circuit 120 also comprises an analog/digital converter 122 which is supplied with the two signals 74, 78 provided by the channels 114, 116 via the two sampling modules 118. Starting from the analog/digital converter 122, the signals 74, 78 are supplied to a signal processing unit 124. FIG. 8 thus shows a refinement of a level of the acceleration sensor 62 and the circuit 120.

With the invention, the absolute angle of rotation between the shafts 52, 54 is available in a measurement range of +/−180°. Taking into account the absolute angle of rotation from the acceleration signal and the rotor position signal, the steering angle can thus be calculated in a range of greater than or less than +/−180°. The so-called index signal, which is a digital switching signal for a revolution of 360°, is thus no longer additionally required, thus making it possible to save on further components in comparison with conventional angle-of-rotation sensors and/or torque sensors.

When carrying out the method according to the invention, the sensor arrangement 50 can be used to determine the angle of rotation of at least one shaft 52, 54 when rotated around its axis of rotation 56. The sensor arrangement 50 has at least one acceleration sensor 60, 62 which is arranged on the at least one shaft 52, 54.

In order to determine the differential angle Δφ between two shafts 52, 54 which can rotate around a common axis of rotation 56, the sensor arrangement 50 comprises at least one first acceleration sensor 60 arranged on a first shaft 52 and at least one second acceleration sensor 62 arranged on a second shaft 54. In this case, the at least one first acceleration sensor 60 determines the angle of rotation of the first shaft 52 and the at least one second acceleration sensor 62 determines the angle of rotation of the second shaft 54. The differential angle Δφ of the two shafts 50, 52 is formed by the sensor arrangement 50 while forming the difference between the angle of rotation of the first shaft 50 and the angle of rotation of the second shaft 52.

The invention claimed is:

1. A sensor arrangement for determining an angle of rotation of at least one shaft when rotated around its axis of rotation, comprising:
   at least one acceleration sensor which is arranged on the at least one shaft; and
   a circuit configured to determine a first angle of rotation at a first time and to determine a second angle of rotation at a second time for the at least one shaft, the circuit configured to obtain an angular velocity of the at least one shaft by forming the quotient of the difference in the second angle of rotation minus the first angle of rotation divided by the difference in the second time minus the first time.

2. The sensor arrangement according to claim 1, in which the at least one acceleration sensor detects a rotation of the at least one shaft around its axis of rotation along the gravitational field of the earth.

3. The sensor arrangement according to claim 1, in which the at least one acceleration sensor has two measuring axes with associated channels, a channel of a first measuring axis detecting a signal in a first spatial direction and a channel of a second measuring axis detecting a signal in a second spatial direction, the two spatial directions being oriented radially with respect to the axis of rotation.

4. The sensor arrangement according to claim 3, in which each of the two channels provides a sinusoidal signal, the signals being phase-shifted through 90°.

5. The sensor arrangement according to claim 1, the circuit configured to determine a differential angle between two shafts which can rotate around a common axis of rotation, the sensor arrangement having at least one first acceleration sensor arranged on a first shaft and at least one second acceleration sensor arranged on a second shaft, the circuit determining the angle of rotation of the first shaft and the circuit determining the angle of rotation of the second shaft, and the circuit forming the differential angle of the two shafts while forming the difference between the angle of rotation of the first shaft and the angle of rotation of the second shaft.

6. A method for determining an angle of rotation of at least one shaft when rotated around its axis of rotation, the angle of rotation being determined by at least one acceleration sensor which is arranged on the at least one shaft; wherein a first angle of rotation is determined at a first time and a second angle of rotation is determined at a second time for the at least one shaft, an angular velocity of the at least one shaft being formed by forming the quotient of the difference in the second angle of rotation minus the first angle of rotation divided by the difference in the second time minus the first time.

7. The method according to claim 6, in which the at least one acceleration sensor determines a first signal of a first measuring axis, which is oriented along a first spatial direction, using a first channel and determines a second signal of a second measuring axis, which is oriented along a second spatial direction, using a second channel, the two spatial directions being oriented perpendicular to the axis of rotation, and one of the two spatial directions being oriented in the direction of the gravitational field of the earth.

8. The method according to claim 7, in which an amplitude of the signal along the first spatial direction is determined using the first channel and an amplitude of the signal along the second spatial direction is determined using the second channel, and in which the angle of rotation is calculated while forming the arc tangent from the quotient of the amplitude of the signal along the first spatial direction divided by the amplitude of the signal along the second spatial direction.

9. The method according to claim 7, in which the signals provided by the at least one acceleration sensor are subjected to low-pass filtering.

* * * * *